US005187867A

United States Patent [19]

Rawlings

[11] Patent Number: 5,187,867

[45] Date of Patent: Feb. 23, 1993

[54] MANUFACTURE OF THERMAL BREAK FRAME SECTIONS

[75] Inventor: David E. Rawlings, Cheltenham, United Kingdom

[73] Assignee: Azon Systems, Inc., Kalamazoo, Mich.

[21] Appl. No.: 736,221

[22] Filed: Jul. 26, 1991

[30] Foreign Application Priority Data

Jul. 28, 1990 [GB] United Kingdom ................. 9016629

[51] Int. Cl.$^{5}$ ............................................. B23P 11/02

[52] U.S. Cl. ................................ 29/897.312; 29/418; 29/453; 29/527.2; 29/527.4; 52/403; 52/743; 49/DIG. 1

[58] Field of Search ........... 29/897.3, 897.31, 897.312, 29/897.32, 411, 412, 416, 418, 423, 453, 460, 527.1, 527.2, 527.4; 52/309.1, 309.5, 309.13, 309.14, 404, 415, 743, DIG. 6, 402, 403; 264/35, 261; 49/DIG. 1, 486, 487

[56] References Cited

U.S. PATENT DOCUMENTS

| | | | |
|---|---|---|---|
| 3,204,324 | 9/1965 | Nilsen | 49/DIG. 1 X |
| 3,423,897 | 1/1969 | Birum, Jr. | 49/504 |
| 3,487,518 | 1/1970 | Hopfeld | 52/729 |
| 3,562,992 | 2/1971 | Kinsey | 52/731 |
| 3,798,869 | 3/1974 | Nipp | 52/743 |
| 3,992,769 | 11/1976 | Jackson | 29/416 |
| 4,040,219 | 8/1977 | Budlich | 52/309.1 X |
| 4,048,273 | 9/1977 | Pryce-Jones | 29/460 X |
| 4,214,415 | 7/1980 | Sukolics | 52/403 X |
| 4,342,144 | 8/1982 | Doguchi | 29/897.312 |
| 4,395,862 | 8/1983 | Jager et al. | 52/403 X |
| 4,619,097 | 10/1986 | Trummer et al. | 49/DIG. 1 X |
| 4,694,552 | 9/1987 | Ecker et al. | 29/418 |

FOREIGN PATENT DOCUMENTS 2196369 4/1988 United Kingdom .

*Primary Examiner*—Mark Rosenbaum
*Assistant Examiner*—S. Thomas Hughes
*Attorney, Agent, or Firm*—Flynn, Thiel, Boutell & Tanis

[57] ABSTRACT

A method of making a thermal barrier component includes the steps of fabricating a first heat-conductive part having spaced transverse first and second projections, fabricating a second heat-conductive part having a transverse flange, moving the heat conductive parts toward each other so that the flange moves into the region between the projections, so that retaining portions on the flange end projections move into engagement and yieldably resist movement of the heat-conductive parts away from each other, and so that outer ends of the projections firmly engage respective surface portions on the second heat-conductive part, thereafter applying to the heat-conductive parts a thermal barrier material which extends between and is fixedly coupled to the heat-conductive parts, and thereafter machining away a central portion of each of the projections.

15 Claims, 1 Drawing Sheet

MANUFACTURE OF THERMAL BREAK FRAME SECTIONS

FIELD OF THE INVENTION

The invention relates to the manufacture of thermal break sections for the use in the manufacture of window or door frame assemblies, or the like.

BACKGROUND OF THE INVENTION

Elongate metal sections for use in the manufacture of window and door frame assemblies are commonly extruded from aluminum. As is well known, it is often desirable for the internal and external parts of the section to be thermally isolated from one another. (In this context "internal" means facing into the interior of the building in which the window or door is fitted, whereas "external" means facing the outside of the building and exposed to the elements.) This thermal isolation prevents the low temperature of the external parts being transmitted to the internal parts and resulting in undesirable condensation on the internal surfaces. To this end it is common practice to provide a thermal break by connecting the internal and external parts of the section only by means of a nonmetallic connector of low thermal conductivity.

There are two main methods currently used for providing such a thermal break. In a first method the section is formed from two separately preformed metal extrusions. These are connected together by preformed rigid non-metallic strips which are designed to interlock with the two metal extrusions respectively. Two non-metallic strips are often provided in spaced relation so as to form, with the metal extrusions, a hollow box section. There is then injected into this hollow box section a settable liquid plastics material, such as a plastics foam, the expansion and setting of which forces the non-metallic strips and metal extrusions into rigid fixed relation.

A second common method of manufacturing a section with a thermal break is by the method known as "pour and cut". According to this method the section is initially extruded in one piece and is so shaped as to define an upwardly facing open channel. The channel is then filled with a settable liquid of low thermal conductivity, usually a plastics resin, which is then allowed to set. The part of the section forming the bottom of the channel is then cut through longitudinally, usually by a circular saw. If necessary, any other parts of the section connecting the internal and external parts thereof are also sawn through so that the internal and external parts remain connected solely by the solidified resin, which thus provides the thermal break.

The latter method has certain advantages. In particular it may be less expensive than the first mentioned method since the apparatus required to perform the method is less costly and easier and cheaper to operate. However, disadvantages can arise in connection with the surface finish of the section. Such sections often need to be colored and various processes are known for providing the sections with a colored coating. There is no problem in using the "pour and cut" method when the section is to be a uniform color all over. However, it is sometimes desirable for the internal and external surfaces of the section to be of different colors, or otherwise of different surface finishes, and this may be difficult to achieve using the "pour and cut" method of forming a thermal break, since the surface finish must normally be applied to the section before the thermal break is formed and it is difficult to apply different colors to different parts of a single section. Sections formed by the "pour and cut" method, therefore, have hitherto normally been of the same color throughout, on both the internal and external surfaces.

The present invention sets out to provide a method whereby two different surface finishes may be achieved in a section where the thermal break is formed by the convenient and cheap "pour and cut" method.

SUMMARY OF THE INVENTION

According to the invention there is provided a method of forming an elongate section, incorporating a thermal break, for use in the manufacture of window or door frame assemblies or the like, the method comprising forming two separate co-extensive elongate metal elements, locating the two elements in engagement with one another so as to provide an upwardly facing channel defined by parts of said two elements respectively, filling said channel with a settable liquid of low thermal conductivity, effecting solidification of the settable liquid to form a solidified separating element, and cutting longitudinally through any part of either metal element which contacts the other metal element so that the two metal elements remain connected only by the solid separating element.

Since the section is formed from two separately preformed co-extensive elements, such elements may have different surface finishes, for example they may be differently colored before they are combined together to make the section. Thus the externally facing part of the section may be of a different color or surface finish from the internally facing part of the section.

Preferably the two metal elements are formed with interlocking parts which inter-engage with one another so that the two elements are locked together in a substantially self-supporting manner. The combined elements may then be handled in exactly the same way as an ordinary one piece section and the "pour and cut" method may be carried out using existing conventional equipment, without modification.

Preferably the interlocking parts are integrally formed with said metal elements respectively. For example, the interlocking parts may comprise two spaced, preferably parallel, flanges on one element between which may be engaged a projecting flange on the other element. Preferably the opposed faces of said spaced flanges are formed with longitudinal inwardly facing projections, which engage the projecting flange on the other element, as it is introduced between the said spaced flanges, and retain it between those flanges.

The projecting flange may have an enlarged head which snaps past said inwardly facing projections, as a result of the resilience of one or both of said spaced flanges. For example, the projecting flange may be generally T-shaped, as viewed in section.

Preferably one of said interlocking parts defines the bottom wall of the aforesaid upwardly facing channel, or at least a major part thereof, the side walls of the channel being defined by other parts of said two metal elements respectively. Thus, in the aforementioned case where the interlocking parts include spaced parallel flanges, one of said flanges may define the bottom wall of the channel.

Preferably, all of said parts of each metal element which contact the other metal element are cut through longitudinally in a single cutting pass along the elements.

One or more of said interlocking parts may be arranged so that when cut through a portion thereof becomes separated from the metal element on which it is formed. In this case the part preferably includes a longitudinally extending enlargement and the cut is effected adjacent said enlargement so that the free edge of the remaining portion is defined by the surface of the enlargement, which is preferably convexly curved as seen in section.

The invention includes within its scope an elongate section, incorporating a thermal break, when manufactured by any of the methods described above.

The invention also includes within its scope a pair of elongate metal elements, for use in any of the methods described above, the elements having portions which, when located in engagement with one another, provide an upwardly facing channel defined by parts of said two elements respectively. Preferably, the two elements are formed with interlocking parts interengaged with one another so that the two elements may be locked together in a substantially self-supporting manner. The elements may also have any of the other characteristics referred to above.

BRIEF DESCRIPTION OF THE DRAWINGS

The following is a more detailed description of an embodiment of the invention, by way of example, reference being made to the accompanying drawings in which.

DETAILED DESCRIPTION

Figure 1:
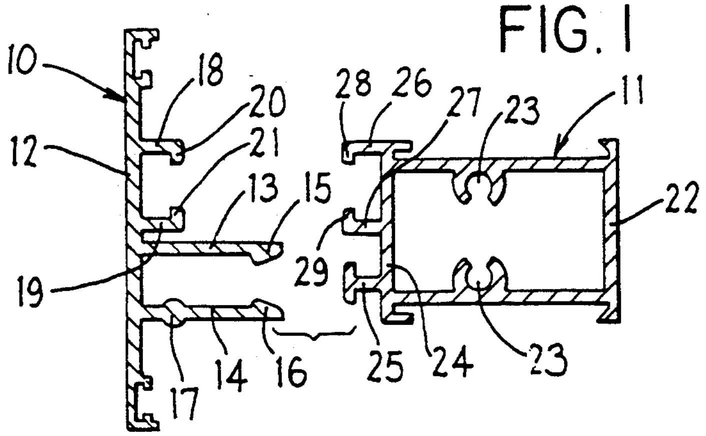
FIG. 1 shows, in section, two metal extrusions for use in the method according to the invention.

Referring to FIG. 1: two elements 10 and 11 are extruded from aluminum, in conventional manner, for assembly into a thermal break section for a window frame assembly.

The element 10 includes a strip 12 which has a flat outer surface which provides the visible external surface of the window frame section. On the opposite face of the strip there are provided two spaced parallel flanges or projections 13 and 14, adjacent the extremities of which are longitudinal inwardly facing retaining ribs 15 and 16. The lower flange 14 is also provided with an enlargement 17 which extends lengthwise and is substantially circular as viewed in cross-section.

Above the flanges 13 and 14 are further shorter flanges 18 and 19 having inwardly turned end portions 20 and 21.

The element 11 is generally of rectangular box section, the outer wall 22 of the box section providing the internally facing surface of the window frame section. The box section also incorporates the usual screw channels 23 for connecting the frame members together at the corners of the window frame assembly.

The opposite wall 24 of the box section is formed with a generally T-shaped projecting flange 25, and spaced flanges 26 and 27 having inturned ends 28 and 29. The flanges 26 and 27 are disposed opposite the flanges 18 and 19 respectively on the other element 10.

Figure 2:
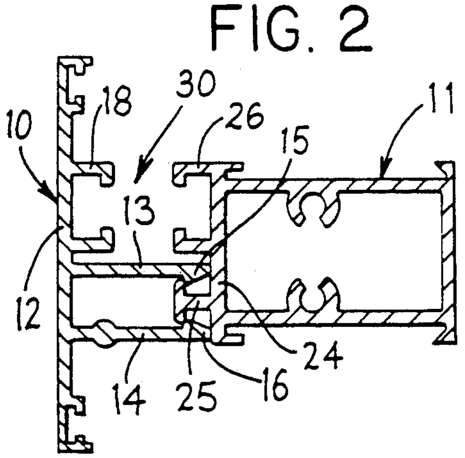
FIG. 2 shows the extrusions when interengaged.

As best seen in FIG. 2, the projecting flange 25 on the element 11 is so shaped and dimensioned that it may pass between the flanges 13 and 14 on the element 10, snapping passed the ribs 15 and 16 on the ends of the flanges 13 and 14 as a result of the resilience of those flanges. The extremities of the flanges 13 and 14 then engage the surface of the wall 24 of the element 11. This causes the two elements 10 and 11 to be locked together comparatively rigidly so that they may be treated in exactly the same fashion as a single extrusion.

The crossbar or head of the T-shaped flange 25 thus serves as a retaining portion which engages the retaining ribs 15 and 16 on the flanges 13 and 14. The flanges 13 and 14 have a degree of inherent resilience, and as shown in FIG. 2, the surface portions of the ribs 15 and 16 which are engaged by the flange 25 are inclined so as to diverge in a direction away from the element 11. Thus, the inherent resilience of the flanges 13 and 14 and the inclination of the surface portions on the ribs 15 and 16 serve to urge the flange 25 (and thus element 11) leftwardly in FIG. 2, so that the outer ends of the flanges 13 and 14 are each maintained in firm engagement with respective surface portions of wall 24 on opposite sides of flange 25, which ensures that the elements 10 and 11 are maintained in proper and accurate alignment with respect to each other, and with uniform spacing between the walls 12 and 24 along the length of elements 10 and 11.

The upper flange 13 of the element 10 cooperates with the portions of the walls 12 and 24 respectively, below the flanges 18 and 26, to define an upwardly facing open channel as indicated at 30.

Figure 3:
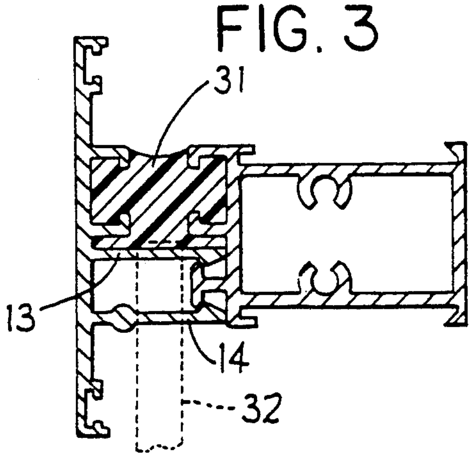
FIG. 3 shows the combined section after a settable resin has been poured.

The combined section is fed into a conventional "pour and cut" machine for the remaining stages of the method according to the invention. The construction and operation of such machines is well known and will not therefore be described in detail. As shown in FIG. 3 the channel 30 is first filled with a settable resin 31 of low thermal conductivity, and this resin is then cured so that it solidifies.

A circular saw, indicated diagrammatically at 32 in FIG. 3 is then traversed longitudinally of the section so as to cut through both the flange 14 and the flange 13 and slightly into the body of the solidified resin.

Figure 4:
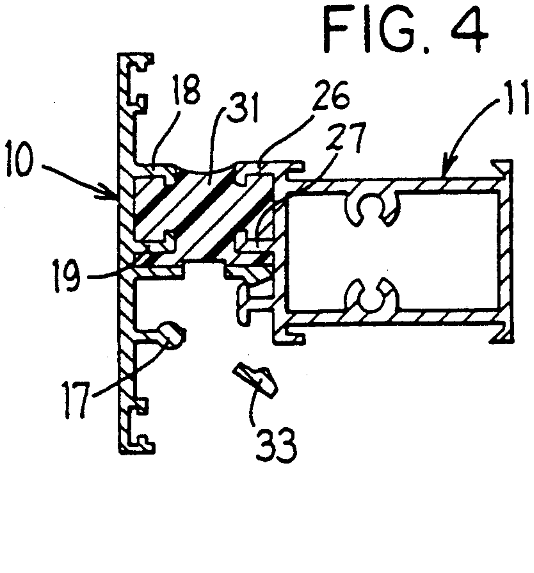
FIG. 4 shows the completed section after the cutting step.

As best seen in FIG. 4, the portion 33 at the free end of the lower flange 13 becomes completely separated from the section and is discarded. The saw cut runs along the circular sectioned enlargement 17 on the element 10 so that the curved edge of the enlargement then forms the exposed extremity of the remaining portion of the flange 14. The enlargement 17 thus serves both as a partial guide to the sawblade 32 and also serves to provide a visually pleasing and smooth surface to the remaining portion of the flange 14.

As will be seen from FIG. 4, after the cutting operation has been completed, the solidified resin 31 provides the only means connecting the elements 10 and 11 and therefore provides the required thermal break. The shaped flanges 18, 19, 26 and 27 interlock with the resin to provide a rigid connection.

It will be appreciated that the particular sectional shapes of the elements described above are strictly by way of example and the invention may be equally applied to sections of other shapes and for other purposes.

Also, it will be appreciated that other forms of interlocking projections on the two elements may be provided to hold them together. Although it is preferred that the engaging parts of the two elements should interlock so that the combined section is self-supporting before the "pour and cut" operation, the invention includes within its scope arrangements where the two separate elements merely engage one another and require to be held in the correct relationship by external supporting means, at least while the pouring operation is taking place. Instead of the inter-engaging parts of the two elements being interlocking as described, they could simply overlie each other, means being provided to clench the parts together at intervals along the length of the section. Alternatively, the two elements may be supported and located by external guides during the pouring operation.

In some sections it is desirable to have two spaced thermal break elements and this arrangement may also be achieved using the present invention. For this purpose the inter-engaging parts may be so shaped that the combined section when assembled provides two spaced channels so arranged that they may be filled and cut using any of the conventional methods for a one-piece section where a double thermal break is required using the "pour and cut" method.

The arrangement described above has the advantage that the elements 10 and 11 can be extruded consistently with the required tolerances using conventional extrusion technology. As previously mentioned, the "pour and cut" apparatus may be of the conventional type and used in the conventional manner once the combined section has been assembled.

The pre-coloring of the elements may be carried out by any of the commonly used methods. The detailed dimensions of the inter-engaging parts of the elements may be so selected as to allow for the thickness of the colored coating and the lesser hardness of the coating may be employed to compensate for tolerances in the dimensions of the inter-engaging parts.

The embodiments of the invention in which an exclusive property or privilege is claimed are defined as follows:

1. A method of making an architectural thermal barrier component, comprising the steps of: fabricating an elongate first heat-conductive part having spaced first and second projections which project outwardly in substantially the same direction transversely of said first heat-conductive part, said first heat-conductive part having a first retaining portion thereon; fabricating an elongate second heat-conductive part having a flange which projects outwardly in a direction transversely of said second heat-conductive part, said second heat-conductive part having thereon first and second surface portions which are disposed on opposite sides of said flange and which face in the direction in which said flange projects outwardly from said second heat-conductive part, and having a second retaining portion thereon; orienting said first and second heat-conductive parts so that said first and second projections on said first heat-conductive part extend toward said second heat-conductive part and said flange on said second heat-conductive part extends towards said projections on said first heat-conductive part; thereafter moving said heat-conductive parts toward each other until said flange moves into the region between said first and second projections so that outer ends of said first and second projections move into engagement with said first and second surface portions and so that said first and second retaining portions move into cooperating engagement with each other, said cooperating engagement between said first and second retaining portions resisting movement of said first and second heat-conductive parts away from each other and maintaining said outer ends of said first and second projections in firm engagement with said first and second surface portions; thereafter applying to said first and second heat-conductive parts a thermal barrier material which extends lengthwise thereof and which extends transversely between and is fixedly coupled to each of said first and second heat-conductive parts; and thereafter machining away a central portion of each of said first and second projections at a location between the ends thereof.

2. A method of claim 1, wherein said step of fabricating said first heat-conductive part includes the step of imparting to said first heat-conductive part a first color; and wherein said step of fabricating said second heat-conductive part includes the step of imparting to said second heat-conductive part a second color different from said first color.

3. A method of claim 1, wherein said step of fabricating said first heat-conductive part includes the step of fabricating said first retaining portion in the form of a respective retaining rib on a side of each of said first and second projections facing the other of said first and second projections, and wherein said step of fabricating said second heat-conductive part includes the step of forming said second retaining portion on said flange.

4. A method of claim 3, wherein said step of fabricating said first heat-conductive part includes the step of forming said first and second projections with a degree of inherent resilience and providing on each of said ribs an inclined surface portion, said inclined surface portions diverging away from each other in a direction away from said second heat-conductive part and each being engageable with said second retaining portion on said flange.

5. A method of claim 4, wherein said step of fabricating said second heat-conductive part includes the step of forming said flange with a T-shaped cross section, said second retaining portion being a crossbar of said T-shaped flange.

6. A method according to claim 5, wherein said step of fabricating said first heat-conductive part includes the step of forming said first and second projections to extend lengthwise of said first heat-conductive part substantially parallel to each other, and wherein said machining step is carried out by machining through each of said first and second projections a slot extending lengthwise of said heat-conductive parts.

7. A method of claim 6, wherein said step of fabricating said second heat-conductive part includes the step of forming said T-shaped flange to extend lengthwise of said second heat-conductive part from one end thereof to an opposite end thereof.

8. A method of claim 6, wherein said second projection has an enlarged portion which extends lengthwise of said first heat-conductive part and which is immediately adjacent said central portion on a side thereof nearest said first heat-conducting part.

9. A method of making an architectural thermal barrier component, comprising the steps of: fabricating an elongate first heat-conductive part having spaced first and second projections which project outwardly in substantially the same direction transversely of said first heat-conductive part, one of said first and second projections having a degree of inherent resilience, and one of said first and second projections having thereon a first retaining portion; fabricating an elongate second heat-conductive part having a flange projecting outwardly in a direction transversely of said second heat-conductive part, said flange having thereon a second retaining portion, and said second heat-conductive part having thereon first and second surface portions which are disposed on opposite sides of said flange and which face in the direction in which said flange projects outwardly from said second heat-conductive part; orienting said first and second heat-conductive parts so that said first and second projections on said first heat-conductive part extend toward said second heat-conductive part and said flange on said second heat-conductive part extends toward said projections on said first heat-conductive part; thereafter moving said first and second heat-conductive parts toward each other so that said flange moves between said first and second projections, outer ends of said first and second projections move into engagement with said first and second surface portions, and said first and second retaining portions move into cooperating engagement with each other which yieldably resists movement of said first and second heat-conductive parts away from each other and which maintains said outer ends of said first and second projections in firm engagement with said first and second surface portions; thereafter applying to said heat-conductive parts a thermal barrier material which extends lengthwise of and which extends transversely between and is fixedly coupled to each of said heat-conductive parts; and thereafter machining away a central portion of each of said first and second projections at a location between said ends thereof.

10. A method of claim 9, wherein said step of fabricating said first heat-conductive part includes the step of imparting to said first heat-conductive part a first color; and wherein said step of fabricating said second heat-conductive part includes the step of imparting to said second heat-conductive part a second color different from said first color.

11. A method of claim 9, wherein said step of fabricating said first heat-conductive part includes the step of forming said first retaining portion as a respective rib on a side of each of said first and second projections facing the other thereof, and said step of fabricating said second heat-conductive part includes the step of forming said flange with a T-shaped cross section, said second retaining portion being a crossbar of said T-shaped cross section.

12. A method of claim 11, wherein said step of fabricating said first heat-conductive part includes the step of forming said first and second projections to extend lengthwise of said first heat-conductive part substantially parallel to each other.

13. A method of claim 12, wherein said step of fabricating said second heat-conductive part includes the step of forming said T-shaped flange to extend lengthwise of said second heat-conductive part from one end thereof to an opposite end thereof.

14. A method of claim 13, wherein said second projection has an enlarged portion which extends lengthwise of said first heat-conductive part and which is immediately adjacent said central portion on a side thereof nearest said first heat-conducting part.

15. A method of making an architectural thermal barrier component, comprising the steps of: fabricating an elongate first heat-conductive part extending in a first direction and having thereon spaced first and second elongate surface portions which face substantially in a second direction transverse to said first direction and which extend along said first heat-conductive part parallel to said first direction, said first heat-conductive part also having thereon an elongate flange which extends along said first heat-conductive part in said first direction and which has a substantially T-shaped cross section, said T-shaped flange including a stem portion which projects in said second direction outwardly beyond said first and second surface portions from a location between said first and second portions, and including a cross portion located at an outer end of and extending transversely to said stem portion; fabricating an elongate second heat-conductive part extending in a third direction and having thereon elongate first and second projections which extend along said second heat-conductive part parallel to each other and said third direction, said projections projecting outwardly from said second heat-conductive part substantially in a fourth direction transverse to said third direction, each of said first and second projections being resiliently flexible so that an outer end thereof may be resiliently deflected in a direction away from the other of said first and second projections, said first and second projections each having thereon near an outer end thereof a retaining rib which projects toward the other of said first and second projections and which extends substantially parallel to said third direction, wherein a first distance in said second direction from said first and second surface portions to said cross portion of said flange on said first heat-conductive part is substantially less than a second distance in said fourth direction from said second heat-conductive part to outer ends of said first and second projections; orienting said first and second heat-conductive parts so that said first and second projections on said second heat-conductive part extend toward said first heat-conductive part and said flange on said first heat-conductive part extends toward said projections on said second heat-conductive part; thereafter moving said heat-conductive parts toward each other until said flange has moved between said first and second projections and the outer ends of said first and second projections are respectively engaging said first and second surface portions, opposite ends of said cross portion of said flange engaging said retaining ribs and flexing said first and second projections away from each other as said cross portion moves between said retaining ribs, wherein when said outer ends of said first and second projections are engaging said first and second surfaces said retaining ribs engage said ends of said cross portion on a side thereof remote from said second heat-conductive part and, in response to said resilient projections resiliently urging said retaining ribs toward each other, resiliently urge said cross portion toward said second heat-conductive part so that said outer ends of said first and second projections are each maintained in firm engagement with a respective one of said first and second surface portions; thereafter applying to said first and second heat-conductive parts a thermal barrier material which extends along said heat-conductive parts parallel thereto and which extends transversely between and is fixedly coupled to each of said first and second heat-conductive parts; and thereafter machining away a portion of each of said first and second projections which is spaced from said outer ends thereof parallel to said fourth direction by a distance which is greater than said first distance and less than said second distance.

* * * * *